Patented Feb. 9, 1932

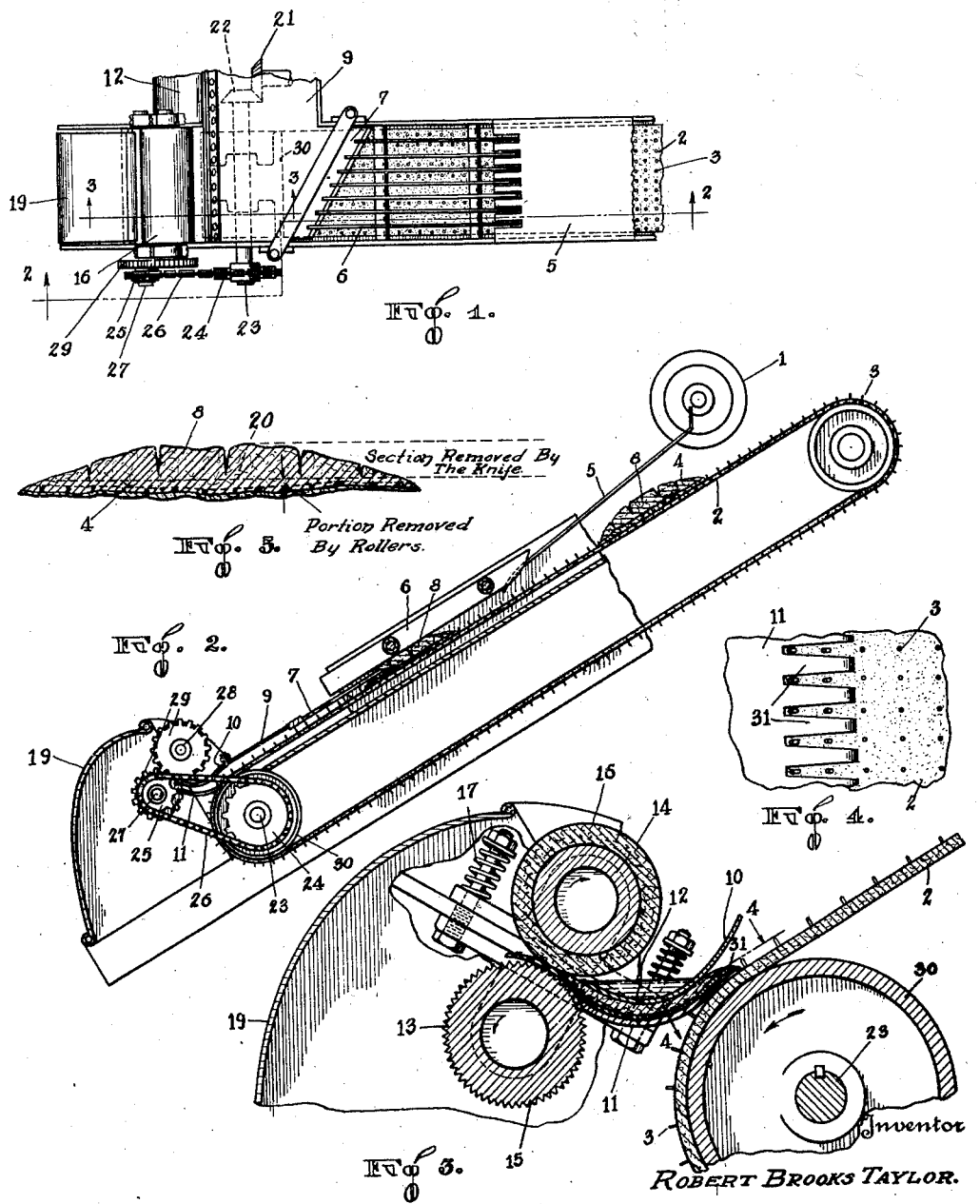

1,844,810

UNITED STATES PATENT OFFICE

ROBERT B. TAYLOR, OF KAPAA, TERRITORY OF HAWAII, ASSIGNOR TO HAWAIIAN CANNERIES, LTD., OF KAPAA, HAWAII, A CORPORATION OF HAWAII

MEANS FOR RECOVERING PINEAPPLE FROM WASTE SHELLS

Application filed May 7, 1928. Serial No. 275,920.

My invention relates to improvements in the process and means for recovering pineapple from waste shells, and it consists in the combinations, constructions and arrangements hereinafter described and claimed, and in the steps hereinafter set forth.

In the canning of pineapple the whole fruits from the fields contain an edible portion and waste portions. The waste portions are the peel, core, and ends. The rest is edible and is usually and herein called the meat.

Machines are now in use that remove the peel, core, and ends, but as at present used, a large portion of the meat is lost because of adhering to the peel.

Present machines remove a cored cylinder of meat from the longitudinal center of the fruits, and this cylinder is subsequently sliced. The cylinder is of such diameter as will fit standard sized cans. As the fruits vary widely in diameter, the removal of the cylinder leaves remaining and clinging to the peel all the balance of the meat.

The peel both on the outside and inside is irregular and rough. On the inside are protrusions into the meat called eyes. Present machines are equipped to cut out or plane off the meat clinging to the peel, but are not able to remove it all without also removing with it the eyes that protrude from the peel into the meat. Therefore, they are adjusted to remove only so much of the meat in the direction of depth that is free of the protrusions of the eyes. The rest of the meat extending from the depth of the eyes to the inner portion of the peel remains clinging to the peel and is wasted as meat.

I have devised a machine which removes this latter part of the meat with its juice without at the same time removing the eyes, thus effecting a far greater recovery of meat.

Other objects and advantages will appear in the following specification, and the novel features of the device will be particularly pointed out in the appended claims.

My invention is illustrated in the accompanying drawings forming a part of this application, in which Figure 1 is a top plan view of a shelling machine for pineapple showing my device operatively applied thereto;

Figure 2 is a section along the line 2—2 of Figure 1;

Figure 3 is an enlarged section detail view of a portion of the device;

Figure 4 is a plan view of a portion of the device looking in the direction of the arrows 4—4 shown in Figure 3; and Figure 5 is a sectional view through a portion of the shell and the fruit.

Refer to drawings Figures 1 and 2, 3 and 4. The center cylinder of meat having been removed from the fruit in the usual manner as by a revolving knife (1), and the peel (4) and clinging meat 8 having been conveyed as on present conveying nail-studded belts 2 through an existing device such as is illustrated by a flat guard 5, vertical grids 6, and a guide 9, in which the peel is flattened by the grids 6 and the meat planed off by a diagonal knife 7 as far as possible without cutting into eye protrusions; I then guide the peel past the guide 9 and over a guide 31 which detaches it from the conveyor belt 2. The peel now passes between guides 10 and 11 curved for a certain purpose hereinafter described, and then passes between two driven rollers 13 and 14. These rollers, driven by any suitable means and held under compression so as to be constantly urged towards each other by springs 17, pass the peel between them to the waste discharge 19, but separate the meat from the peel without removing the protruding eyes on the peel, prior to this passage, depositing the meat and contained juice on the curved guide 10 which is curved for the purpose of conveying the meat and juice away from the machine as in a flume indicated by the reference numeral 12. The meat does not pass between the rollers, and consequently is not squeezed in the slightest, but is ejected back from the rollers in almost a fountain of meat.

The lower roller 13 may be roughened as at 15 from the purpose of better grasping the peel, and the upper roller 14 may have a soft surface 16 such as rubber, and, in fact, I have found by experiment with hard and soft surfaces, that with a slightly soft surface, better separation of meat is secured with fewer eye protrusions detached from the peel than with a hard surfaced upper roller.

Thus, by guiding the peel from the present machines which have removed all meat to a line 20 near the peel, but which does not reach the depth of the eye protrusions, and then guiding and passing it through my machine, I separate from the peel the meat still clinging to the peel up to the peel itself, and have left attached to the peel the protruding eyes alone, effecting a great saving of meat which is suitable for canning purposes.

In perfecting my machine, I have tried various positions of the rollers, some of which passed the peel through with the outside upward, and some of which passed the peel through with the outside downward, and have adopted the latter as producing the cleanest material best adapted for canning purposes.

The machine I have invented can be and has been easily incorporated into a single composite machine with other existing machines, and either in combination with them or acting separately with them, will complete the work of entirely removing the pineapple meat from the shell which they have partially accomplished.

The parts may be actuated by a driving bevel gear 21 that meshes with a bevel gear 22, thereby rotating a shaft 23. A sprocket 24 is mounted upon the shaft and is connected to a sprocket 25 by a chain 26. The sprocket 25 is mounted upon a shaft 27, and this shaft is operatively connected to a shaft 28 by gears 29. The shafts 27 and 28 carry the rollers 13 and 14 already referred to. The shaft 28 is carried by movable bearings 18.

The shaft 23 carries drums or pulleys 30 around which the belt 2 is disposed. In this way all of the various parts are interconnected and are timed so that the peels will be conveyed between the rollers one at a time. I prefer to have the speed of the rollers 13 and 14 increased a trifle beyond that of the travel of the belt 2.

Figure 4 shows how the lower guide 11 is formed with fingers 31 that bear against the belt 2 and straddle nails 3 carried by the belt. This construction causes the shell to pass from the belt to the lower guide without becoming stuck. The device is extremely simple in construction, and is durable and efficient for the purpose intended.

Although I have shown and described one embodiment of my invention, it is to be understood that the same is susceptible of various changes, and I reserve the right to employ such changes as may come within the scope of the appended claims.

I claim:

1. In a device of the type described, a pair of rollers yieldingly urged toward each other, means for rotating said rollers for causing them to receive a pineapple peel therebetween, said rollers exerting sufficient pressure to effect the separation of meat from the peeling without removing eyes from the peeling or breaking off parts of the peeling, and a flume disposed adjacent to the upper roller for receiving the meat.

2. In a device of the type described, a pair of rollers arranged one above the other, the lower roller having a roughened surface while the upper roller has a soft rubber surface, means for rotating said rollers for causing the roughened one to engage with a pineapple peel and the other to separate the meat from the shell and a flume disposed adjacent to the soft rubber roller.

3. In a device of the type described, a pair of rollers arranged one above the other, the lower roller having a roughened surface while the upper roller has a soft rubber surface, means for rotating said rollers for causing the roughened one to engage with a pineapple peel and the other to separate the meat from the shell, and yielding means for urging said rollers toward each other and a flume disposed adjacent to the soft rubber roller.

4. In combination, a pineapple peel guide extending upwardly at a slight angle, a pair of rollers disposed on opposite sides of the guide, one of said rollers being rough for engaging with the peel while the other is smooth for removing the meat, and a flume disposed adjacent to the smooth roller and at a lower level for receiving the meat.

5. In combination, a pineapple peel guide extending upwardly at a slight angle, a pair of rollers disposed on opposite sides of the guide, one of said rollers being rough for engaging with the peel while the other is smooth for removing the meat, a flume disposed adjacent to the smooth roller and at a lower level for receiving the meat, and spring means for urging said rollers toward each other.

6. In combination, an endless conveyor carrying spikes for engaging with a pineapple peel, a guide for removing the peels from the conveyor and comprising upper and lower members, rollers disposed at the end of the guide for removing the meat from the peels, the upper guide members constituting a flume for receiving the meat.

ROBERT B. TAYLOR.